(12) United States Patent
Schroeder et al.

(10) Patent No.: US 6,374,875 B1
(45) Date of Patent: Apr. 23, 2002

(54) DEVICE FOR METERING A GRANULAR MATERIAL

(75) Inventors: Manfred Schroeder, Neustadt; Hans Gröner, Limburgerhof; Dieter Metzger, Hochdorf-Assenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/704,609

(22) Filed: Nov. 3, 2000

(30) Foreign Application Priority Data

Nov. 4, 1999 (DE) .......................... 199 53 228

(51) Int. Cl.[7] .............. B65B 1/04; B65B 3/04; B67C 3/00
(52) U.S. Cl. .......... 141/322; 141/320; 141/321; 222/450
(58) Field of Search .................. 141/67, 107, 319, 141/320, 321, 322, 328, 348, 350, 363–366, 383, 384, 386; 222/425, 438, 445, 450

(56) References Cited

U.S. PATENT DOCUMENTS

| 1,891,038 A | * | 12/1932 | Barros ................. 222/438 |
| 5,275,215 A | * | 1/1994 | Derby .................. 141/67 |
| 5,542,583 A | * | 8/1996 | Boyer et al. .......... 222/425 |

* cited by examiner

Primary Examiner—Timothy L. Maust
(74) Attorney, Agent, or Firm—Oblon, Spivak, McClelland, Maier & Neustadt, P.C.

(57) ABSTRACT

A metering device for dispensing a free-flowing, fine-grained granular material. The metering device can be connected to the packaging container which holds the granular, fine-grained material and contains a housing (1) which holds the granular material. The housing (1) can be closed by means of two closures (19, 20), which can be moved alternately from an open position (25) into a closed position (26) and vice versa.

11 Claims, 2 Drawing Sheets

DEVICE FOR METERING A GRANULAR MATERIAL

Figure 1:
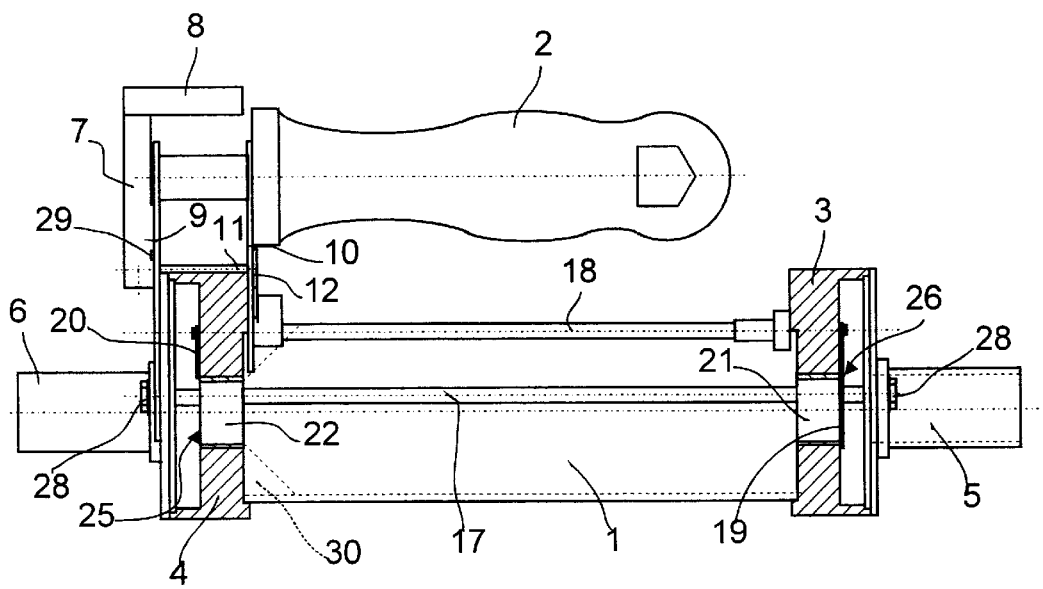

The invention relates to a device for metering a granular material, such as a free-flowing microgranulate, which is applied in exactly metered quantities, it being necessary for the user to be protected as far as possible against contact with the granular material.

Until now, products in liquid form have predominantly been used as soil disinfectants for treating overhead-line masts in the open air. Dispensing liquid soil disinfectants against nematodes, soil-borne diseases, soil insects and germinating weeds is subject to numerous disadvantages. When liquid products are dispensed by means of spray devices, plumes of spray mist are produced, even when there is a moderately severe wind, and their inspiration can be extremely hazardous for the user dispensing the soil disinfectant. In the case of soil disinfectants to be dispensed in liquid form, there is additionally the residual quantity problem, since the packaging containers containing the residual quantities are often extremely difficult to empty completely. In order nevertheless to achieve the most complete emptying of he containers containing the soil disinfectant, the products are transferred, which entails not inconsiderable risks for the person handling the disinfectant as a result of its running out.

Apart from the use of liquid soil disinfectants or pesticides, structures made of timber, such as overhead-line masts, foot bridges or bridge superstructures may necessitate a treatment against fungicidal attack, it being necessary for the pesticide to be introduced into the interior of the timber structure, be it an overhead-line mast, a pier or more of the like. For this purpose, holes are bored into the timber components to be treated, into which holes a free-flowing, fine-grained granulate has to be introduced in an exactly metered manner.

In view of the technical problem indicated, the invention is based on the object of providing a metering device which is largely shielded against the environment and permits the granular material to be dispensed directly without the person handling the metering device being exposed directly to the material to be dispensed.

According to the invention, the object is achieved by a metering device for dispensing a free-flowing, fine-grained granular material, which device comprises a housing which holds said material, it being possible for the metering device to be connected to a packaging container in which the fine-grained material is stored and for the housing to be closed by means of two closures, which can be moved alternately from an open position into a closed position.

The solution proposed by the invention permits any contact to be avoided between the user of the metering device and the granular material to be dispensed. The ability of the housing to be connected via two closures to a packaging container that stores the granular material, means that said container can be emptied in such a way that no disposal of residual quantities arises, and it is not necessary to transfer a material which is extremely damaging to the health of the user, such as a timber treatment agent or a soil disinfectant.

In a further refinement of the idea on which the invention is based, the closures are particularly advantageously accommodated in the end regions of the housing. The end regions of the housing can be, for example, ends which are produced from plastics and which each have an opening which can be closed and opened by a pivotable flap in each case let into the plastic end of the housing. The closures can be connected to each other both in a form-fitting manner and with a force fit; the respective actuation of a closure is carried out in a manner coordinated with the actuation of the respective other closure. The housing, which holds the supply of free-flowing, fine-grained material, is advantageously fabricated from transparent material and can consist either of glass or of an impact-resistant and fracture-resistant plastic material. Transparent material permits simple visual inspection of the supply of material still located in the housing.

In order to limit the quantity of the respective material to be dispensed which can be held in the housing, disk-like elements can be inserted into said housing. These can be provided in the end regions of the housing, or else designed as funnel-like, annular elements and promote the discharge of material through the openings accommodating the closures in the plastic ends. In order to store a larger quantity of material within the housing, an existing housing can simply be replaced by a lengthened housing which can hold a larger supply of material. In order to move the closures integrated into the end regions of the housing, an actuating element is accommodated in one of the end regions of the housing and accommodates a rotary element, whose recesses engage in cams. As a result, the cams, which are fixed to drivers, engage in the rotary element, as a result of which the cams have a rotation impressed on them, which pivots the closures via transmission elements which extend parallel to the axis of the housing.

Bores which open into outlet connecting pieces which are integrally molded at the end regions are advantageously provided in the end regions, fabricated from plastic, for example. This permits the simple input of material into the housing which stores the granular material, and in addition the free-flowing, fine-grained material can easily be inserted into correspondingly inclined bores provided in timber structures.

For the easier handling of the free-flowing materials to be dispensed, in the central position of the actuating element, both closures are in a closed position and are sealed off with respect to the two outlet connection pieces, so that the supply of material held in the housing is sealed off from the outside. When the actuating element is pivoted from its central position, in the first deflected position of the actuating element, the first closure is closed and the second closure is open, pivoting the actuating element back into its central position allows both closures to be moved into their respectively closed position; pivoting the actuating element into the second deflected position, beyond the central position, opens the first closure and closes the second closure with respect to the connecting piece.

The discharge, the storage and the refilling of the housing of the metering device according to the invention are carried out via an actuating element which can be pivoted into three positions and which is very simple to operate. Accommodated on the housing which stores the free-flowing granulate is a handle, with which the housing can be handled; located beside the handle is the grip area of the actuating element, which may be operated without releasing the handle and permits the metering device to be handled even by those persons who are inexperienced in handling the metering device.

Figure 1A:
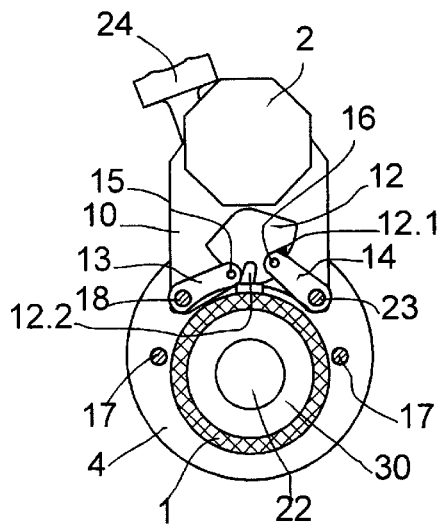
Figure 2:
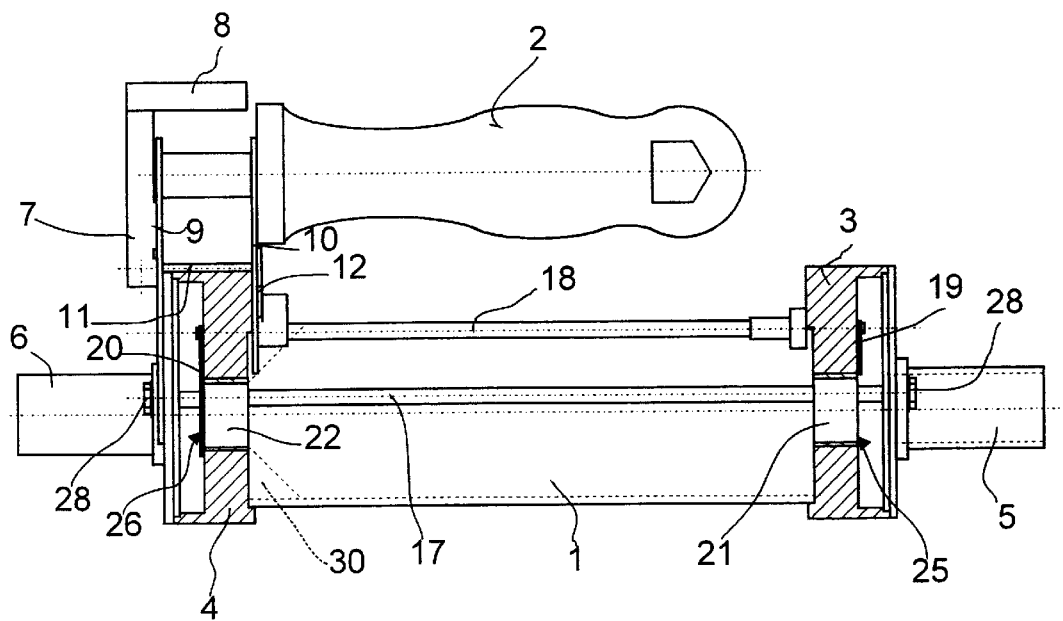
Figure 2A:
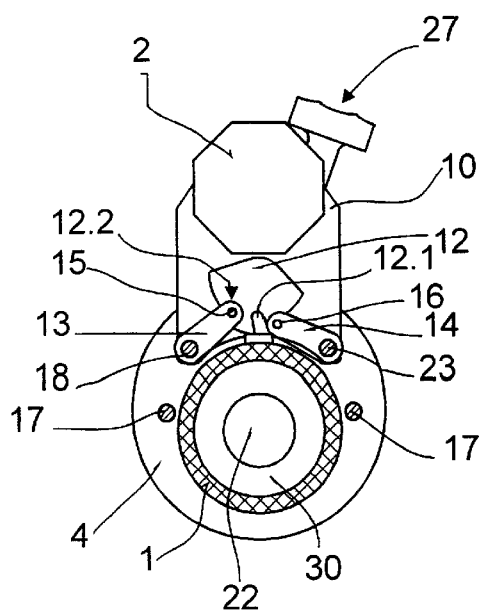

The invention will be explained in more detail below using a drawing, in which:

FIG. 1 shows a longitudinal section through the metering device with one closure opened and the second closure closed, FIG. 1A shows a cross section through the metering device with the tilting element deflected and the actuating cams interacting therewith, FIG. 2 shows a longitudinal section through the metering device with the second closure open and the first closure closed, and FIG. 2A shows a cross section through the metering device with the tilting element deflected, corresponding to the opening and closing position of the two closures illustrated in FIG. 2.

FIG. 1 illustrates a longitudinal section through the metering device according to the invention, in which the closures are moved into an alternately open and a closed position.

The housing 1, preferably fabricated from transparent material such as glass or fracture-resistant and impact-resistant plastic, is provided with a first and a second end 3, 4. The ends 3, 4 are preferably fabricated from plastic, and integrally molded on at each of the ends 3, 4 is an outlet connecting piece 5 and 6, respectively, via which the housing 1 can be emptied and filled. Fitted at one of the housing ends 3, 4 are two shields 9, 10 which are located behind one another and to which a handle 2 that extends parallel to the housing 1 is fixed, and moreover an actuating element 7 designed as a tilting lever is mounted on the shields 9, 10. Provided on the tilting lever 7 is a thumb area 8, with which the actuating element 7 can be moved into a central position and a first deflected position 24, illustrated in FIG. 1A, and into a second deflected position, illustrated in FIG. 2A.

Accommodated on the actuating element 7 is a shaft 11 which passes through the shields 9, 10 and to which a tilting element 12 is fixed; on the tilting element 12 there are recesses 12.1 and 12.2, which are illustrated specifically in FIG. 1A and which bring about a pivoting movement of the closures 19, 20, see FIG. 1A. The two ends 3, 4 in each case contain an opening 21, 22 which can be closed and opened by the closures 19, 20 that can be actuated. The openings 21, 22 are let into the two ends 3, 4 in such a way that they are aligned with the outlet connecting pieces 5, 6 and therefore permit the easier discharge of product and the easier input of product into the interior of the housing. The two ends 3, 4, preferably fabricated as injection-molded plastic parts, can be braced against each other via two coach bolts 17 provided inside or else outside the housing 1. By loosening the coach-bolt nuts 28 at one end of the housing 1, an end 3 or 4 can be removed and the tubular housing 1 can be replaced for a longer or shorter one, or provided with insert elements 30. By selecting the insert element 30, firstly the volume in the housing 1 can be adapted, but the insert element 30 can equally well be of funnel-like design in order—as indicated in FIG. 1—to permit an easier discharge of product through the opening 22 into the outlet connecting piece 6.

In the operating position shown in FIG. 1 of the metering device according to the invention, the first closure 19 is illustrated as located in position 26, and prevents new free-flowing, granular material from continuing to flow in. The second closure 20 is, by contrast, located in its open position 25 and opens the opening 22 in the end 4 of the housing 1, and therefore permits the housing 1 to be emptied through the outlet connecting piece 6.

Beside the coach bolt 17 that connects the ends 3, 4 there extends, between the two ends 3, 4, a setting shaft 18, via which the closure 19 can be pivoted, so that the latter either closes the opening 21—as illustrated—or opens said opening.

FIG. 1A shows a cross section through the housing of the metering device according to the invention.

The actuating element 7 is in a first deflected position 24. As a result, on the shield 10, the tilting element 12—containing two recesses 12.1 and 12.2—is rotated slightly in the counterclockwise direction. In this deflected position 24, the opening 22 in the front end 4 is open. The closure 20 closing or opening the opening 22 is, in this position, pivoted into an opening position, specifically as a result of a pin 16 of the cam 14 engaging in one of the recesses in the tilting element 12. The cam 14 is accommodated on a bolt 23 which passes through the shields 9, 10 at the front end 4. At its end opposite to the cam 14, the bolt 23 accommodates the closure 20, which is pivoted into the open position illustrated in FIG. 1. In FIG. 1A, the recess 12.2 can also be seen, being released by the pin 15 of the nonactuated cam 13. Since the pin 15 of the cam 13 has been released by the tilting element 12, the closure 19 provided in the rear end 3 is illustrated in its pivoted position 26 (see FIG. 1); closing the housing 1 between the ends 3, 4. The recesses 12.1, 12.2 in the tilting element 12 are configured such that they release the respective pins 15, 16 of the cams 13, 14 during the pivoting movement about the shaft 11 and pick up said cams again as the tilting element 12 is rotated further—for example from the deflected position 24 into position 27 corresponding to the section deflected position according to FIG. 2A.

In the deflected position 24 of the actuating element 7 illustrated in FIG. 1A, the recess 12.1 has picked up the pin 16 of the cam 14 and rotated the cam 14 about the axis of the bolt 23. As a result, the opening 22 in the end 4 of the housing 1 is open, while the rear opening 21 is closed by the further closure. The insert element 30—be it configured as a funnel-like discharge aid as indicated in FIG. 1, or as an annular insert let in to the housing 1 coaxially with the opening 22—preferably consists of plastic and permits the maximum volume of granulate to be held in the housing 1 to be limited.

FIG. 2 shows a longitudinal section through the metering device according to the invention, the second closure 20 now being shown in a closed position 26, while the first closure 19 has been set into an open position 25. To this end, by means of the actuating element 7 rotatably mounted on the shields 9, 10, the tilting element 12 can be rotated from the deflected position 24 into the deflected position 27 (see FIG. 2A). For this purpose, the operator, who has gripped the metering device according to the invention by the handle 2, changes the actuating element 7 over beyond the central position by means of a simple pivoting movement of the thumb area 8. The tilting element 12 experiences a rotational movement about its shaft 11 and, in so doing, moves the second closure 20 in the end 4 into its closed position 26, while at the same time, as a result of the pivoting of a cam, the actuating shaft 18 connected to the latter effects the opening of the first closure 19. During the pivoting movement of the tilting element 12, it should be noted that the actuating of the tilting element 12, carried out from the deflected position 24 in FIG. 1A into the deflected position 27 according to FIG. 2A, moves the second closure 20 from an open position 25 into its closed position 26 before, as a result of further pivoting of the actuating element into the deflected position 27, the recess 12.2 catches the pin 15 on the cam 13. This means that, in the central position of the actuating element 7, both closures 19, 20 are closed together for a time interval, and neither emptying of the housing nor filling of the housing 1 can take place.

Only when the tilting element 12, as illustrated in FIG. 2A, is pivoted into the deflected position 27 does the recess 12.2 in the tilting element 12 catch the pin 15 of the cam 13. The latter is pivoted about its axis and rotates the actuating shaft 18. The actuating shaft 18 transmits the rotary movement to the first closure 19, the latter is in turn moved into a position which opens the opening 21 on the housing 1. In order to prevent premature wear of the side faces of the recesses 12.1 and 12.2 on the tilting element 12 which guide the pins 15, 16, said side faces may be hardened by means of a common hardening process or may be equipped with insert elements permitting slot-like guidance, in order to achieve improved guidance of the pins 15, 16 in the recesses 12.1 and 12.2 in the tilting element 12. In the exemplary embodiments illustrated in FIG. 2A, the tilting element 12 has just released the pin 16 of the cam 14, and the cam 14 is located against the surface of the housing 1—inactive, since the second closure 20 has been set into its closing position 26 on the end 4 of the housing 1.

Parallel to the housing 1 there extend coach bolts 17, with which the two ends 3, 4 can be braced against each other and with which centering of the cylindrical housing 1 is made possible. The position of the coach bolts 17 on the ends 3, 4 which respectively seal off the housing 1 can be variable, so that housings 1 of greater diameter can be accommodated. This provides the capability for easy adaptation to larger volumes for granulates.

In the illustrations according to FIG. 1A to FIG. 2A, manual actuating forms of the two closures 19, 20 are illustrated. Instead of a manually pivotable actuating element 7, electromagnetic opening and closing of the closures 19, 20 on the housing 1 is also conceivable, it being possible for the activation of the actuating magnet to be triggered by pressure on a knob—integrated, for example, into the thumb area 8 of the actuating element 7. The metering device according to the invention can advantageously be handled at a handle 2, in front of which there is arranged the thumb area 8 with which the actuating element 7 can be actuated in a simple way.

In order to permit the complete emptying of residual pack quantities from storage containers, the connecting pieces 5, 6 can be provided with internal and external threads or connected via bayonet connections. The discharge of products into bores which are provided in timber structures and which accommodate the fine-grained granulate can be further simplified by flexible tubes provided on the connecting pieces 5, 6, in each case on the discharge side.

| List of reference symbols | |
|---|---|
| 1 | Housing |
| 2 | Handle |
| 3 | First end |
| 4 | Second end |
| 5 | Connecting piece |
| 6 | Connecting piece |
| 7 | Tilting lever |
| 8 | Thumb area |
| 9 | Front shield |
| 10 | Rear shield |
| 11 | Shaft |
| 12 | Tilting element |
| 12.1 | First recess |
| 12.2 | Second recess |
| 13 | Cam |
| 14 | Cam |
| 15 | Pin |
| 16 | Pin |
| 17 | Coach bolt |
| 18 | Actuating shaft |
| 19 | First closure |
| 20 | Second closure |
| 21 | Rear opening |

-continued

| List of reference symbols | |
|---|---|
| 22 | Front opening |
| 23 | Bolt |
| 24 | First deflected position |
| 25 | Open closure position |
| 26 | Closed closure position |
| 27 | Second deflected position |
| 28 | Threaded nut |
| 29 | Stop |
| 30 | Insert element |

We claim:

1. A metering device for dispensing a free-flowing, fine-grained granular material, it being possible for the metering device to be connected to a packaging container in which the granular material is stored, comprising:

a housing which holds the granular material, wherein:

the housing can be closed by means of two closures, which can be moved alternately from an open position into a closed position, and an actuating element accommodated at one of two end regions of the housing accommodating a tilting element whose recesses engage in pins.

2. A metering device as claimed in claim 1, wherein the closures are accommodated in the end regions of the housing.

3. A metering device as claimed in claim 1, wherein the closures are connected to each other in a form-fitting manner.

4. A metering device as claimed in claim 1, wherein the capacity of the housing can be varied by means of elements which can be inserted into the housing.

5. A metering device as claimed in claim 1, wherein the pins are accommodated on cams, which actuate the closures via transmission elements.

6. A metering device as claimed in claim 1, wherein the end regions are aligned with connecting pieces which permit material to be put in and discharged.

7. A metering device as claimed in claim 1, wherein in the central position of the actuating element, the two closures are set into their closed position.

8. A metering device as claimed in claim 1, wherein in a first deflected position of the actuating element, a first closure is closed and a second closure is open.

9. A metering device as claimed in claim 1, wherein in a further deflected position of the actuating element, the first closure is opened and the second closure is closed.

10. A metering device as claimed in claim 1, which is provided with a handle.

11. A metering device for dispensing a free-flowing, fine-grained granular material, it being possible for the metering device to be connected to a packaging container in which the granular material is stored, comprising:

a housing which holds the granular material, wherein:

the housing can be closed by means of two closures, which can be moved alternately from an open position into a closed position, and an actuating element accommodated at one of two end regions of the housing accommodating a tilting element configured to rotate about a shaft whose recesses engage in pins.

* * * * *